United States Patent
Krishnamoorthy et al.

(10) Patent No.: US 9,591,527 B2
(45) Date of Patent: Mar. 7, 2017

(54) ENHANCED MECHANISM TO ACHIEVE BETTER THROUGHPUT IN X+GSM MSMS DEVICES

(71) Applicant: QUALCOMM Incorporated, San Diego, CA (US)

(72) Inventors: Parthasarathy Krishnamoorthy, Hyderabad (IN); Mungal Singh Dhanda, Slough (GB); Reza Shahidi, San Diego, CA (US); Anand Rajurkar, Hyderabad (IN); Bhaskara Viswanadham Batchu, Hyderabad (IN); Suresh Sanka, Hyderabad (IN); Janga Reddy Alimineti, Hyderabad Andhra Pradesh (IN); Karthik Dumpala, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/643,525

(22) Filed: Mar. 10, 2015

(65) Prior Publication Data

US 2016/0269938 A1 Sep. 15, 2016

(51) Int. Cl.
| | |
|---|---|
| *H04W 72/00* | (2009.01) |
| *H04W 28/12* | (2009.01) |
| *H04W 24/08* | (2009.01) |
| *H04W 8/18* | (2009.01) |
| *H04W 24/02* | (2009.01) |
| *H04W 60/00* | (2009.01) |
| *H04W 76/02* | (2009.01) |
| *H04W 76/04* | (2009.01) |
| *H04W 88/06* | (2009.01) |

(52) U.S. Cl.
CPC ............ *H04W 28/12* (2013.01); *H04W 8/18* (2013.01); *H04W 24/08* (2013.01); *H04W 24/02* (2013.01); *H04W 60/005* (2013.01); *H04W 76/025* (2013.01); *H04W 76/048* (2013.01); *H04W 88/06* (2013.01)

(58) Field of Classification Search
USPC ...................................... 455/453, 522, 552.1
See application file for complete search history.

(56) References Cited

U.S. PATENT DOCUMENTS

| 8,134,977 | B2 | 3/2012 | Parekh et al. | |
| 8,238,298 | B2 * | 8/2012 | Zhao | ..................... H04L 41/147 370/310 |

(Continued)

OTHER PUBLICATIONS

International Search Report and Written Opinion—PCT/US2016/017264—ISA/EPO—May 4, 2016.

*Primary Examiner* — Qutbuddin Ghulamali
(74) *Attorney, Agent, or Firm* — Procopio, Cory, Hargreaves & Savitch LLP

(57) ABSTRACT

A method for improving data throughput on a subscription includes: filtering data traffic throughput on a first subscription; comparing the filtered data traffic throughput to a threshold data rate; determining if the filtered data traffic throughput is greater than a threshold data rate value; and in response to a determination that the filtered data traffic throughput is equal to or less than the threshold data rate value, determining whether a tune away (TA) mode different than a first TA mode increases data traffic throughput on the first subscription.

14 Claims, 3 Drawing Sheets

(56) References Cited

U.S. PATENT DOCUMENTS

| | | |
|---|---|---|
| 8,761,788 B2 | 6/2014 | Rajurkar et al. |
| 8,843,175 B2 * | 9/2014 | Nukala ............... H04W 80/06 |
| | | 455/515 |
| 2005/0025052 A1 * | 2/2005 | Zhao ................ H04L 12/5602 |
| | | 370/230 |
| 2009/0239533 A1 * | 9/2009 | Somasundaram ... H04J 11/0093 |
| | | 455/434 |
| 2013/0235843 A1 | 9/2013 | Gohari et al. |
| 2013/0295920 A1 | 11/2013 | Viswanadham et al. |
| 2013/0301411 A1 * | 11/2013 | Yoshida ............... H04W 24/08 |
| | | 370/231 |
| 2013/0303181 A1 * | 11/2013 | Rajurkar ........... H04W 72/0453 |
| | | 455/452.1 |
| 2013/0322586 A1 * | 12/2013 | Tabet ................ H04L 25/0206 |
| | | 375/350 |
| 2013/0337861 A1 | 12/2013 | Bhogaraju et al. |
| 2014/0274051 A1 | 9/2014 | Hsu et al. |

* cited by examiner

ENHANCED MECHANISM TO ACHIEVE BETTER THROUGHPUT IN X+GSM MSMS DEVICES

BACKGROUND

An X+Global System for Mobile communications (X+GSM) dual subscriber identity module (SIM) dual standby (DSDS) mobile communication device, where "X" may be any radio access technology (RAT) (e.g., Code Division Multiple Access (CDMA), Wideband Code Division Multiple Access (WCDMA), Long Term Evolution (LTE), etc.) having a single transceiver chain can experience throughput degradation on its data subscription (e.g., high data rate (HDR) WCDMA). Data throughput may degrade because the data subscription shares the radio frequency (RF) chain with the GSM subscription for periodic page monitoring according to the GSM discontinuous receive (DRx) cycle.

For each tune away (TA), the data subscription must perform data rate control (DRC) ramp-down prior to TA and DRC ramp-up after TA. When the TA gaps for the GSM subscription are back to back, the data subscription is unable to obtain control of the RF chain for the minimum ramp-down/ramp-up duration resulting in throughput degradation on the data subscription.

Different tune away (TA) modes are available that may decrease the GSM tune away duration and improve throughput on the data subscription. However, under certain conditions, one TA mode may outperform other TA modes with respect to data throughput.

SUMMARY

Apparatuses and methods for improving data throughput on a data subscription that shares an RF chain are provided.

According to various embodiments there is provided a method. In some embodiments, the method may include filtering data throughput on a first subscription; comparing the filtered data throughput to a threshold data rate; determining if the filtered data traffic throughput is greater than a threshold data rate value; and in response to a determination that the filtered data traffic throughput is equal to or less than the threshold data rate value, determining whether a tune away (TA) mode different than a first TA mode increases data traffic throughput on the first subscription.

According to various embodiments there is provided a mobile communication device. In some embodiments, the mobile communication device may include a communication unit configured to transmit and receive radio frequency signals for a plurality of radio access technologies (RATs); and a control unit configured to control overall operation of the mobile communication device.

The control unit may be configured to: filter data throughput on a first subscription; compare the filtered data throughput to a threshold data rate; determine if the filtered data traffic throughput is greater than a threshold data rate value; and in response to a determination that the filtered data throughput is equal to or less than the threshold data rate, determine whether a tune away (TA) mode different than a first TA mode increases data throughput on the first subscription.

According to various embodiments there is provided a non-transitory computer readable medium having stored therein a program. In some embodiments, the program may include processor executable instructions for performing operations including: filtering data throughput on a first subscription; comparing the filtered data throughput to a threshold data rate value; determining if the filtered data traffic throughput is greater than a threshold data rate value; and in response to a determination that the filtered data throughput is equal to or less than the threshold data rate, determining whether a tune away (TA) mode different than a current TA mode increases data throughput on the first subscription.

According to various embodiments there is provided a mobile communication device. In some embodiments, the mobile communication device may include: means for filtering data traffic throughput on a first subscription for a filtering period; means for comparing the filtered data traffic throughput to a threshold data rate value; means for determining if the filtered data traffic throughput is greater than a threshold data rate value; and in response to a determination that the filtered data traffic throughput is equal to or less than the threshold data rate value, means for determining whether a tune away (TA) mode different than a first TA mode increases the data traffic throughput on the first subscription.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

For a multi-subscription, multi standby (MSMS) device, such as a DSDS mobile communication device, data throughput on a data subscription may degrade because the data subscription shares the RF chain with a GSM subscription (i.e., voice subscription) for periodic page monitoring according to the GSM DRx cycle. Various embodiments may implement operations for dynamically switching between tune away modes.

Figure 1:
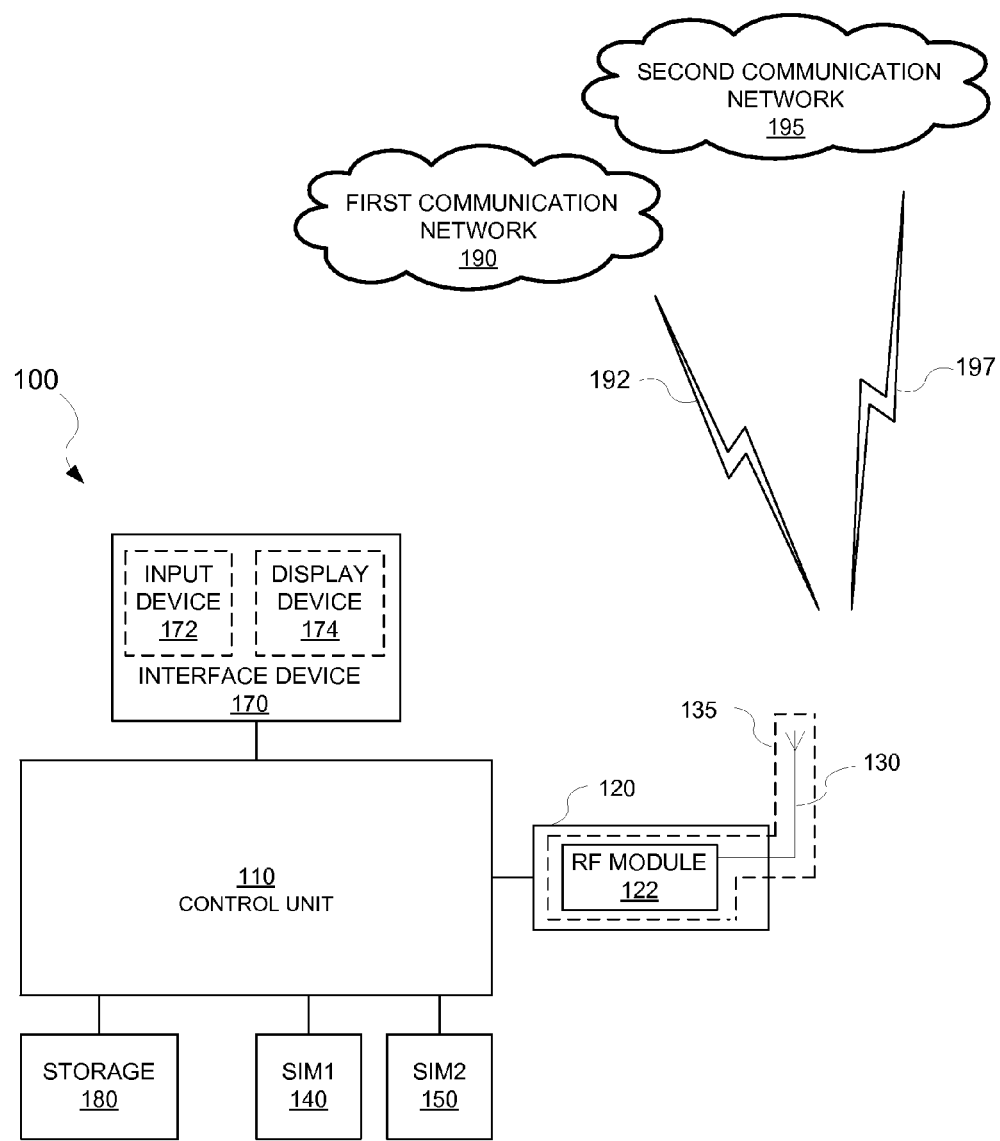
FIG. 1 is a block diagram illustrating a mobile communication device according to various embodiments.

FIG. 1 is a block diagram illustrating a mobile communication device 100 according to various embodiments. As illustrated in FIG. 1, the mobile communication device 100 may include a control unit 110, a communication unit 120, an antenna 130, a first SIM 140, a second SIM 150, a user interface device 170, and a storage 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communications units) and may interface with one or more antennas without departing from the scope of the present inventive concept.

The communication unit 120 may include, for example, but not limited to, an RF module 122. The RF module 122 may include, for example, but not limited to a first transceiver (not shown). An RF chain 135 may include, for example, but not limited to the antenna 130 and the RF module 122.

The first SIM 140 may associate the communication unit 120 with a first subscription (Sub1) 192 on a first communication network 190 and the second SIM 150 may associate the communication unit 120 with a second subscription (Sub2) 197 on a second communication network 195. For convenience, throughout this disclosure, Sub1 192 is identified as the data subscription and Sub2 197 is identified as the voice subscription. One of ordinary skill in the art will appreciate that either subscription may be a data and/or voice subscription without departing from the scope of the present inventive concept.

The first communication network 190 and the second communication network 195 may be operated by the same or different service providers, and/or may support the same or different radio access technologies (RATs), for example, but not limited to, GSM, CDMA, WCDMA, and LTE.

The user interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the communication unit 120, the user interface device 170, and the storage 180. The control unit 110 may be a programmable device, for example, but not limited to, a microprocessor (e.g., general-purpose processor, baseband modem processor, etc.) or microcontroller.

The storage 180 may be configured to store application programs for operation of the mobile communication device 100 that are executed by the control unit 110, as well as application data and user data.

In various embodiments, the control unit 110 may periodically check data traffic throughput on the data RAT subscription (e.g., Sub1 192) to determine if data traffic throughput is below a certain threshold. The periodic check may be performed by the control unit 110 and may take into account factors including mobility, signal-to-interference-and-noise ratio (SINR), current achieved data traffic throughput, etc.

When the filtered (e.g., averaged) data traffic throughput over a period of time (i.e., the filtering period) is below a threshold value, the control unit 110 may determine the number of tune away periods and the average time between consecutive tune away periods over the filtering period to estimate mobile communication device 100 mobility conditions, and may determine the filtered SINR of the data RAT subscription to estimate channel conditions. The filtering period may be dynamically configurable in a range of about 200 milliseconds (ms) to 1 second (s) or another range. Based on the determinations, the control unit 110 may choose an appropriate tune away mode.

Figure 2:
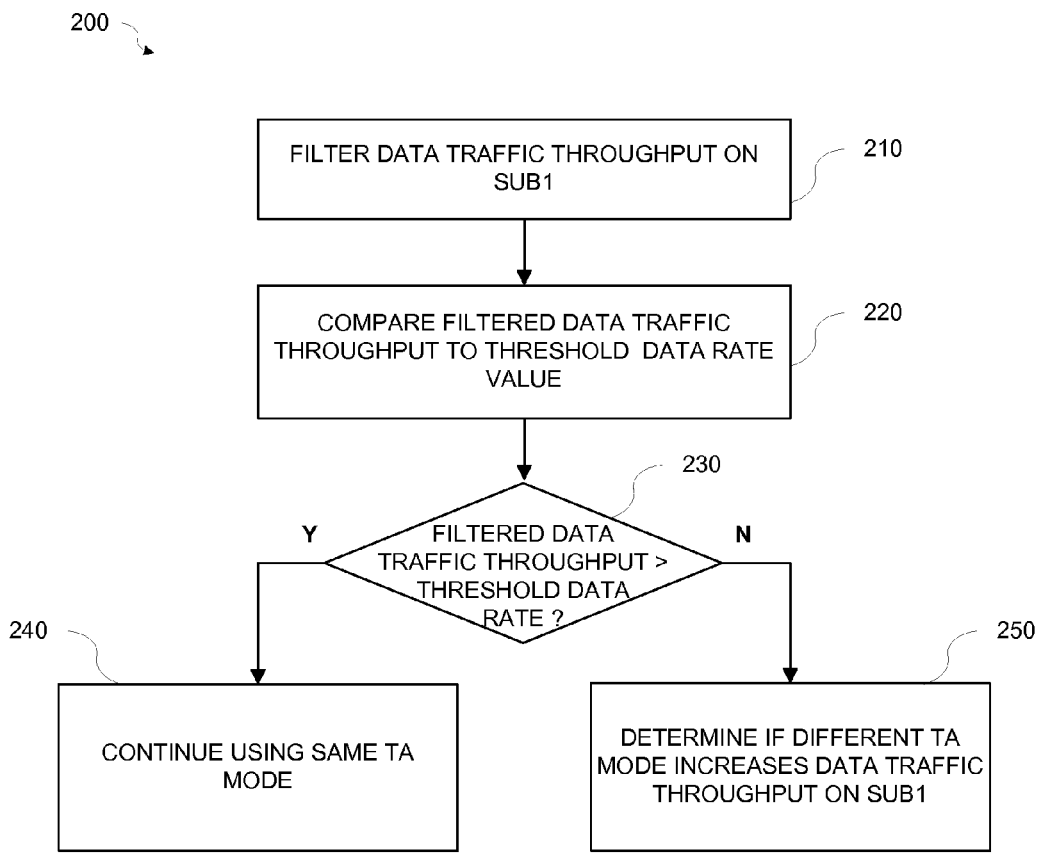
FIG. 2 is a method according to various embodiments.

FIG. 2 is a method 200 according to various embodiments. Referring to FIGS. 1 and 2, the control unit 110 may filter data traffic throughput on the data RAT subscription (e.g., Sub1 192) (210). The filtering may be, for example, but not limited to, averaging the data traffic throughput over a period of time. The control unit 110 may compare the filtered data traffic throughput to a threshold data rate value (220). The threshold data rate value may be dynamically configurable in a range of about 100-800 kilobytes per second (kbps) or another range.

If the control unit 110 determines that the filtered data traffic throughput is greater than the threshold data rate value during the filtering period (230-Y), the control unit 110 may cause the mobile communication device 100 to continue using the same TA mode (240). If the control unit 110 determines that the filtered data traffic throughput is equal to or less than the threshold data rate value during the filtering period (230-N), the control unit 110 may determine whether a tune away procedure different than a current tune away procedure increases data traffic throughput on the first subscription (250).

Figure 3:
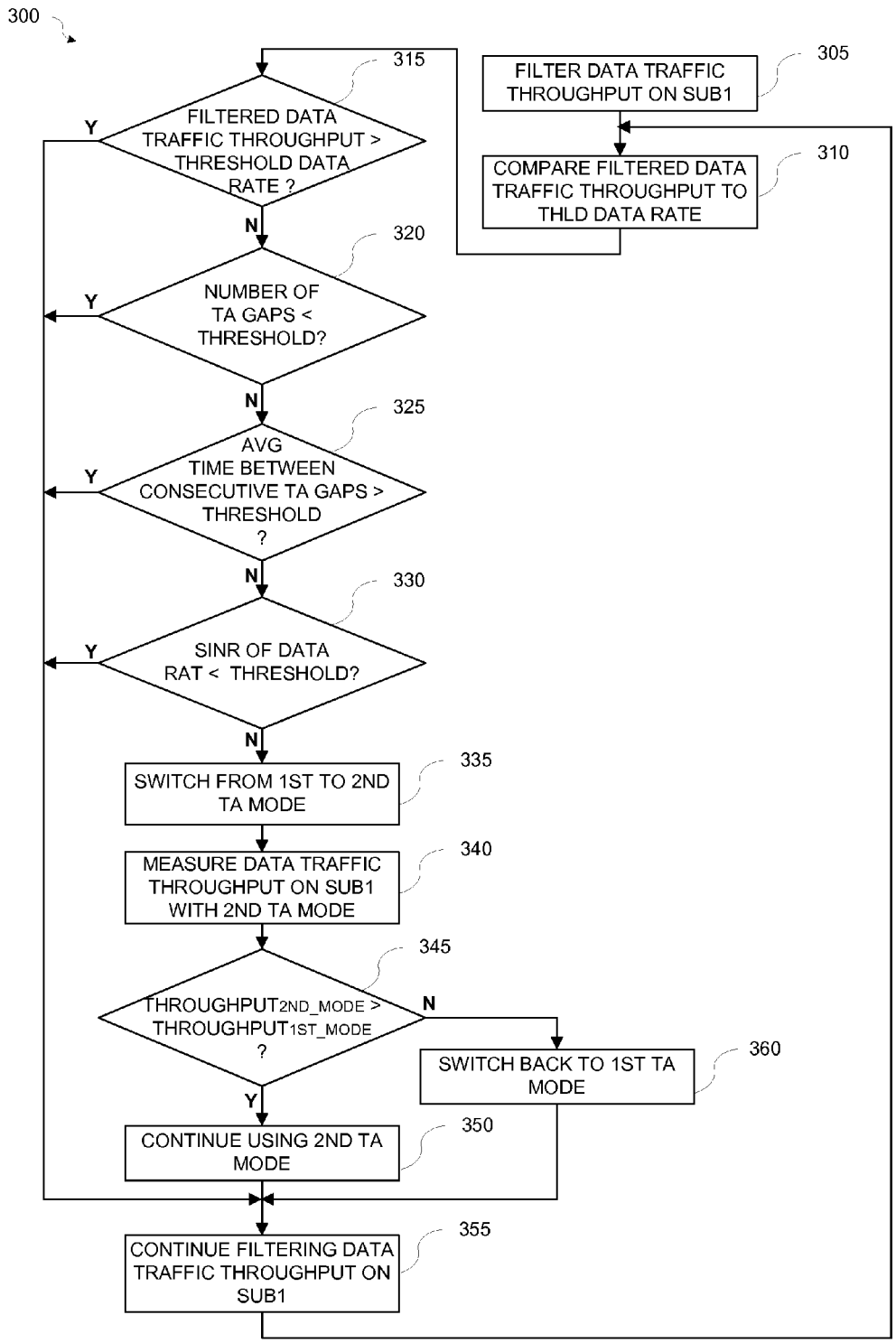
FIG. 3 is a method according to various embodiments.

FIG. 3 is a method 300 according to various embodiments. Referring to FIGS. 1-3, the control unit 110 may filter data traffic throughput on the data subscription RAT (e.g., Sub1 192) (305). The filtering may be, for example, but not limited to, averaging the data traffic throughput over a filtering period. The control unit 110 may compare the filtered data traffic throughput to a threshold data rate value (310).

If the control unit 110 determines that the filtered data traffic throughput is greater than the threshold data rate value (315-Y), the control unit 110 may continue to filter data traffic throughput on Sub1 192 over a next filtering period (355) before making another comparison of the data traffic throughput to the threshold data rate value at operation 310. Thus, the filtered data traffic throughput may be compared to threshold data rate value periodically based on the filtering period. For example, if the filtering period is 400 ms, the filtered data traffic throughput may be compared to threshold data rate value every 400 ms.

If the control unit 110 determines that the filtered data traffic throughput on Sub1 192 is equal to or less than the threshold data rate value (315-N), the control unit 110 may determine the number of TA gaps during a filtering period for Sub2 197 (320). The threshold number of TA gaps may be in a range of about four to twenty TA gaps or another range. If the control unit 110 determines that the number of TA gaps for Sub2 197 during the filtering period is less than the threshold number of TA gaps (320-Y), the control unit 110 may continue to filter data traffic throughput on Sub1 192 over a next filtering period (355) before making another comparison of the data traffic throughput to threshold data rate value at operation 310.

If the control unit 110 determines that the number of TA gaps for Sub2 197 is equal to or greater than the threshold number of TA gaps (320-N), the control unit 110 may determine the average time between consecutive TA gaps for Sub2 197 during the filtering period (325). The threshold average time between consecutive TA gaps may be in a range of 10-200 milliseconds (ms) or another range.

If the control unit 110 determines that the average time between consecutive TA gaps for Sub2 197 during the filtering period is greater than the threshold average time between consecutive TA gaps during the filtering period (325-Y), the control unit 110 may continue to filter data traffic throughput on Sub1 192 over a next filtering period (355) before making another comparison of the data traffic throughput to data rate value at operation 310. If the control unit 110 determines that the average time between consecutive TA gaps for Sub2 197 during the filtering period is equal to or less than a threshold average time between consecutive TA gaps (325-N), the control unit 110 may determine if the SINR of the data RAT on Sub1 192 during the filtering period is greater than a threshold SINR value (330). The threshold SINR value may be equal to or greater than −2 dB or another value.

If the control unit 110 determines that the SINR of the data RAT on Sub1 192 is less than the threshold SINR value (330-Y), the control unit 110 may continue to filter data throughput on Sub1 192 over a next filtering period (355) before making another comparison of data throughput to data rate at operation 210. If the control unit 110 determines that the SINR of the data RAT on Sub1 192 during the filtering period is equal to or greater than the threshold SINR value (330-N), the control unit 110 may cause the communication unit 120 to switch from a first TA mode to a second TA mode for a next filtering period (or another length of time) (335) and measure filtered data traffic throughput of the data RAT on Sub1 192 for the second TA mode (340).

In some embodiments, the first TA mode may enable the mobile communication device 100 to tune away from a first RAT to a second RAT even in between the page bursts of a page block. The second TA mode may prevent the mobile communication device 100 from tuning away from the first RAT to the second RAT in between the page bursts of a page block. In other embodiments, other types of TA modes may be implemented.

The control unit 110 may compare the filtered data traffic throughput on Sub1 192 for the second TA mode to the filtered data traffic throughput for the first TA mode (345). If the control unit 110 determines that the filtered data traffic throughput for the second TA mode is greater than the filtered data traffic throughput for the first TA mode (345-Y), the control unit 110 may cause the communication unit 120 to continue using the second TA mode (350). If the control unit 110 determines that the filtered data traffic throughput on Sub1 192 for the second TA mode is equal to or less than the filtered data traffic throughput for the first TA mode (345-N), the control unit 110 may cause the communication unit 120 to switch back to the first TA mode (360).

While the present inventive concept has been described with respect to a first TA mode and a second TA mode, one of ordinary skill in the art will appreciate that various embodiments may incorporate more than two TA modes without departing from the scope of the present inventive concept.

The methods 200 and 300 described with respect to FIGS. 2 and 3, respectively, may be embodied on a non-transitory computer readable medium, for example, but not limited to, the storage 180 or other non-transitory computer readable medium known to those of skill in the art, having stored therein a program including computer executable instructions for making a processor, computer, or other programmable device execute the operations of the methods.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for improving data traffic throughput on a subscription of a mobile communication device, the method comprising:
   filtering data traffic throughput on a first subscription of the mobile communication device for a filtering period;
   comparing the filtered data traffic throughput to a threshold data rate value;
   determining if the filtered data traffic throughput is greater than a threshold data rate value; and
   in response to a determination that the filtered data traffic throughput is equal to or less than the threshold data rate value, determining whether a tune away (TA) mode for the mobile communication device different than a first TA mode increases the data traffic throughput on the first subscription,
   wherein the determining whether the TA mode different than the first TA mode increases the data traffic throughput on the first subscription comprises:
   determining if a number of TA gaps for the first subscription is equal to or greater than a threshold number of TA gaps during the filtering period or determining if an average time between consecutive TA gaps for the first subscription is equal to or less than a threshold average time between consecutive TA gaps during the filtering period.

2. The method of claim 1, wherein the determining whether the TA mode different than the first TA mode increases the data traffic throughput on the first subscription comprises:
   determining if a signal-to-interference-and-noise ratio (SINR) of a radio access technology on the first subscription is equal to or greater than a threshold SINR value during the filtering period.

3. The method of claim 1, further comprising:
   switching from the first TA mode to a second TA mode for a next filtering period; and
   measuring filtered data traffic throughput of the first subscription for the second TA mode.

4. The method of claim 3, further comprising:
   comparing the filtered data traffic throughput on the first subscription for the second TA mode to the filtered data traffic throughput for the first TA mode.

5. The method of claim 4, further comprising:
   in response to a determination that the filtered data traffic throughput on the first subscription for the second TA mode is equal to or less than the filtered data traffic throughput for the first TA mode, switching back to the first TA mode.

6. The method of claim 4, further comprising:
   in response to a determination that the filtered data traffic throughput on the first subscription for the second TA mode is greater than the filtered data traffic throughput for the first TA mode, continuing to use the second TA mode.

7. A mobile communication device, comprising:
   a communication unit configured to transmit and receive radio frequency signals for a plurality of radio access technologies (RATs); and
   a control unit configured to control overall operation of the mobile communication device,
   wherein the control unit is configured to:
      filter data traffic throughput on a first subscription for a filtering period;
      compare the filtered data traffic throughput to a threshold data rate value;
      determine if the filtered data traffic throughput is greater than a threshold data rate value; and
      in response to a determination that the filtered data traffic throughput is equal to or less than the threshold data rate value, determining whether a tune away (TA) mode different than a first TA mode increases data traffic throughput on the first subscription,
      wherein the determining whether a tune away (TA) mode different than a first TA mode increases data traffic throughput on the first subscription comprises determining if a number of TA gaps for the first subscription is equal to or greater than a threshold number of TA gaps during the filtering period or determining if an average time between consecutive TA gaps for the first subscription is equal to or less than a threshold average time between consecutive TA gaps during the filtering period.

8. The mobile communication device of claim 7, wherein the control unit is configured to determine if a signal-to-interference-and-noise ratio (SINR) of a radio access technology on the first subscription is equal to or greater than a threshold SINR value during the filtering period.

9. The mobile communication device of claim 7, wherein the control unit is configured to:
   cause the communication unit to switch from the first TA mode to a second TA mode for a next filtering period; and
   measure filtered data traffic throughput of the first subscription for the second TA mode.

10. The mobile communication device of claim 9, wherein the control unit is configured to compare the filtered data traffic throughput on the first subscription using the second TA mode to the filtered data traffic throughput for the first TA mode.

11. The mobile communication device of claim 10, wherein in response to a determination that the filtered data traffic throughput on the first subscription for the second TA mode is not greater than the filtered data traffic throughput for the first TA mode, the control unit is configured to cause the communication unit to switch back to the first TA mode.

12. The mobile communication device of claim 10, wherein in response to a determination that the filtered data traffic throughput on the first subscription for the second TA mode is greater than the filtered data traffic throughput for the first TA mode, the control unit is configured to cause the communication unit to continue to use the second TA mode.

13. A non-transitory computer readable medium having stored therein a program for making a processor execute a method for improving data traffic throughput on a subscription of a mobile communication device, the program including processor executable instructions for performing operations comprising:

filtering data traffic throughput on a first subscription of the mobile communication device for a filtering period;

comparing the filtered data traffic throughput to a threshold data rate value;

determining if the filtered data traffic throughput is greater than a threshold data rate value; and in response to a determination that the filtered data traffic throughput is equal to or less than the threshold data rate value, determining whether a tune away (TA) mode of the mobile communication device different than a first TA mode increases data traffic throughput on the first subscription, wherein the determining whether the TA mode different than the first TA mode increases the data traffic throughput on the first subscription comprises:

determining if a number of TA gaps for the first subscription is equal to or greater than a threshold number of TA gaps during the filtering period or determining if an average time between consecutive TA gaps for the first subscription is equal to or less than a threshold average time between consecutive TA gaps during the filtering period.

14. A mobile communication device, comprising:

means for filtering data traffic throughput on a first subscription for a filtering period;

means for comparing the filtered data traffic throughput to a threshold data rate value;

means for determining if the filtered data traffic throughput is greater than a threshold data rate value; and in response to a determination that the filtered data traffic throughput is equal to or less than the threshold data rate value, means for determining whether a tune away (TA) mode different than a first TA mode increases the data traffic throughput on the first subscription, wherein the determining whether the TA mode different than the first TA mode increases the data traffic throughput on the first subscription comprises:

determining if a number of TA gaps for the first subscription is equal to or greater than a threshold number of TA gaps during the filtering period or determining if an average time between consecutive TA gaps for the first subscription is equal to or less than a threshold average time between consecutive TA gaps during the filtering period.

* * * * *